(12) United States Patent
Flandre et al.

(10) Patent No.: US 8,065,042 B2
(45) Date of Patent: Nov. 22, 2011

(54) COMMUNICATION METHOD AND DEVICE FOR A MOTOR VEHICLE

(75) Inventors: Loïc Flandre, Boissy Saint Leger (FR); Grègoire Sadoux, Asnieres sur Seine (FR)

(73) Assignee: Valeo Vision, Bobigny (FR)

( * ) Notice: Subject to any disclaimer, the term of this patent is extended or adjusted under 35 U.S.C. 154(b) by 859 days.

(21) Appl. No.: 11/458,213

(22) Filed: Jul. 18, 2006

(65) Prior Publication Data

US 2007/0033312 A1 Feb. 8, 2007

(30) Foreign Application Priority Data

Jul. 19, 2005 (FR) ...................................... 05 07636

(51) Int. Cl.
*G05D 1/00* (2006.01)
*H04J 3/06* (2006.01)
(52) U.S. Cl. ........................................... 701/1; 370/503
(58) Field of Classification Search .............. 701/1, 110; 710/110; 370/503
See application file for complete search history.

(56) References Cited

U.S. PATENT DOCUMENTS

| 6,065,082 | A  | * | 5/2000 | Blair et al. | ..................... 710/105 |
| 6,681,342 | B2 | * | 1/2004 | Johnson et al. | ................. 714/30 |
| 2003/0070019 | A1 | * | 4/2003 | Dalakuras et al. | ............ 710/110 |
| 2004/0202201 | A1 | * | 10/2004 | Hugas et al. | .................. 370/503 |

FOREIGN PATENT DOCUMENTS

DE 10254738 7/2004

OTHER PUBLICATIONS

Rylander & Wallin, "LIN—Local Interconnect Bus", 2003, pp. 19-30, XP002263433, Master's Thesis Chalmers University of Technology Goteburg.
Ruff M, "Evolution of Local Interconnect Network (LIN) Solutions", Vehicular Technology Conference, 2003, pp. 3382-3389, VTC 2003 Fall, 2003 IEEE 58th Orlando, FL USA.

\* cited by examiner

*Primary Examiner* — James Trammell
*Assistant Examiner* — Muhammad Shafi
(74) *Attorney, Agent, or Firm* — Jacox, Meckstroth & Jenkins

(57) ABSTRACT

A communication method is implemented in an on-board network between a master station (M) and a plurality of slave stations (S1, S2, S3, S4), of the type of those compatible with the standard Local Interconnect Network (LIN) protocol in which data frames are sent by the slave stations on a serial bus in response to the sending by the master station of identifiers (4, 6) representative of the required content of the frames. All (7) or part of each of the specific data frames attached to the same predetermined identifier (4, 6) is formed sequentially by each of the slave stations. This enables an optimisation of the load on a LIN network, thus enabling use of this economical standard for all "passenger compartment functions", and in particular for the management of AFS type advanced lighting systems.

18 Claims, 5 Drawing Sheets

COMMUNICATION METHOD AND DEVICE FOR A MOTOR VEHICLE

BACKGROUND OF THE INVENTION

1. Field of the Invention

The present invention concerns a method and a device for communication on an on-board network, in particular for a motor vehicle, compatible with the LIN standard, in order to optimise the load on this network.

2. Description of the Related Art

The use of an ever greater number of electromechanical devices in motor vehicles has led to an increase in the number of electrical circuits. In order to reduce the growing complexity of the wiring, "network" or "bus" techniques, already known in the computing field, have been adapted to the constraints of the automotive world.

The essential functions of vehicles are generally carried out "under the bonnet" by making use of a high-speed real-time network connecting the actuators and sensors of the engine, transmission, braking system, suspension, chassis, etc. to an electronic control unit (ECU). A Controller Area Network (CAN), providing a high degree of security and a transmission speed of the order of 1 Mbps, is frequently used for these functions.

For other less essential security functions and comfort functions, referred to as "passenger compartment functions", a Local Interconnect Network (LIN) has been developed by motor vehicle constructors and semiconductor manufacturers.

This reduced-cost secondary network is based on a UART/SCI interface that is standard for the majority of microcontrollers. It works with the CAN bus and is used specifically for applications such as electric mirrors, electric seats, central locking, window regulators and lighting systems.

From the initial version 1.0 of 1999 up to version 2.0 of 2003, the specifications of the LIN network have gone through several developments tending to facilitate the integration of a network and improve the real-time characteristics.

All the details of these specifications are well known to persons skilled in the art, and only those necessary for understanding the invention will be repeated hereinafter.

Exchange of information on the LIN network is based on the presence of a master station and one or more slave stations. Communication is always carried out at the initiative of the master station which sends a message header comprising a silence followed by a synchronisation byte, and an identification byte or identifier.

A slave station having decoded a predetermined identifier transmits a data frame in response comprising two, four or eight data bytes and a checksum.

The header and data frame form a message frame.

It should be noted that the message identifier is representative of the content of the message, but not of its destination.

An identifier $IDF[7:0]$ is formed from an identity $ID[0:5]$ coded in six bits and two parity bits $P0=ID0+ID1+ID2+ID4$ (mod. 2) and $P1=ID1+ID3+ID4+ID5$ (mod. 2).

There are 64 different identities, but only the first 60 (00 to 3B, in hexadecimal representation) correspond to message frames.

The last four identities are special identities, in particular command frame, configuration and diagnostics identities.

The following table draws up a list of the valid identities and identifiers according to revision 2.0 of the LIN protocol specifications:

TABLE I

| Identity ID[0:5] | Identifier IDF[7:0] | Frame type |
|---|---|---|
| 00 to 3B | P1P0ID[5:0] | Message frame |
| 3C | 3C | Command frame (request from the master station) |
| 3D | 7D | Command frame (response from the slave station in the frame) |
| 3E | FE | User-defined extended frame |
| 3F | BF | Future extended frame |

During the developments of the standard, the main characteristics of the LIN network were not fundamentally modified, and its transmission speed is still limited to 20 Kbps owing to constraints of electromagnetic compatibility and clock synchronisation without the use of a quartz crystal or ceramic resonator.

However, the "passenger compartment functions" prove to be increasingly greedy in terms of passband, in particular those relating to the AFS (Advanced/Adaptative Front Light System) advanced lighting system.

Directional lighting devices of the DBL (Dynamic Bending Light) type, or devices for automatic adjustment of the level of the headlight beams according to the attitude of the vehicle of the LVL (Levelling of Vehicle Light) category, connected by the network to the LCS (Light Control System) dedicated on-board computer, require very short response times.

Extension of the network to the control of future applications such as multi-xenon headlights, ballasts and LEDs will further increase the load on the bus.

A first solution for absorbing the increase in load on the network would be to increase the transmission speed thereof. But the initial advantages (low cost, low interference) of the LIN network would be lost.

A second solution would be to change standard and use more advanced networks such as CAN, but there again the cost would be prejudicial.

There is therefore a need for optimising the load on a LIN network in order to retain this economical standard for all the "passenger compartment functions", and especially the management of AFS type advanced lighting systems, both present and future.

SUMMARY OF THE INVENTION

An aim of the present invention is therefore a method of communication on an on-board network, in particular for a motor vehicle, between a master station and a plurality of slave stations, of the type of those compatible with the standard Local Interconnect Network (LIN) protocol.

In these methods, in a known manner, data frames are sent by the slave stations on a serial bus in response to the sending by the master station of identifiers representative of the required content of these frames.

As for the method according to the invention, it is remarkable in that all or part of each of the specific data frames attached to the same predetermined identifier is formed sequentially by each of the slave stations.

According to a first preferred embodiment of the invention, a series of specific data frames is sent by the slave stations in response to the sending by the master station of a succession of several examples of this predetermined identifier, equal in number to that of the slave stations.

Most advantageously, each of the slave stations also sends an end-of-frame block consisting of a checksum calculated on the series of specific data frames.

Advantageously also, an additional identifier is sent by the master station before each sending of the succession of several examples of the predetermined identifier.

Benefit is gained from the fact that this predetermined identifier is representative of a frame with a response in the frame, and also that the additional identifier is representative of a request for the status of the slave stations.

Preferably these predetermined and additional identifiers respectively consist of the bytes 7D and 3C in hexadecimal representation.

According to a second preferred embodiment of the invention, each of said specific data frames is formed from several sub-frames of the same length and equal in number to the number of slave stations.

In this second embodiment, the last of the slave stations to sequentially send the last of the sub-frames advantageously sends consecutively an end-of-frame block preferably consisting of a checksum calculated on all these sub-frames.

The invention also concerns a device for communication on an on-board network, in particular for a motor vehicle, remarkable in that it comprises means for using the communication method described above.

An information storage means, characterised in that it stores one or more programs whose execution enables implementation of the communication method according to the invention, is also an aim of the present application.

The same applies to a computer program on an information storage means comprising one or more sequences of instructions executable by an information processing unit such as a microprocessor, microcontroller, computer and/or state machine, the execution of said sequences of instructions enabling implementation of the method briefly described above.

A vehicle, in particular a motor vehicle, remarkable in that it uses a communication device, an information storage means or a computer program having respectively the characteristics described above, is also the object of the present invention.

These few essential specifications will have made obvious to persons skilled in the art the advantages provided by this method of communication on an on-board network compatible with the LIN protocol compared with the standard.

The detailed specifications of the method, and of a device adapted to its use, are given in the following description in conjunction with the accompanying drawings. It should be noted that these drawings have no purpose other than illustrating the text of the description and in no way constitute a limitation of the scope of the invention.

These and other objects and advantages of the invention will be apparent from the following description, the accompanying drawings and the appended claims.

and

Figure 5:
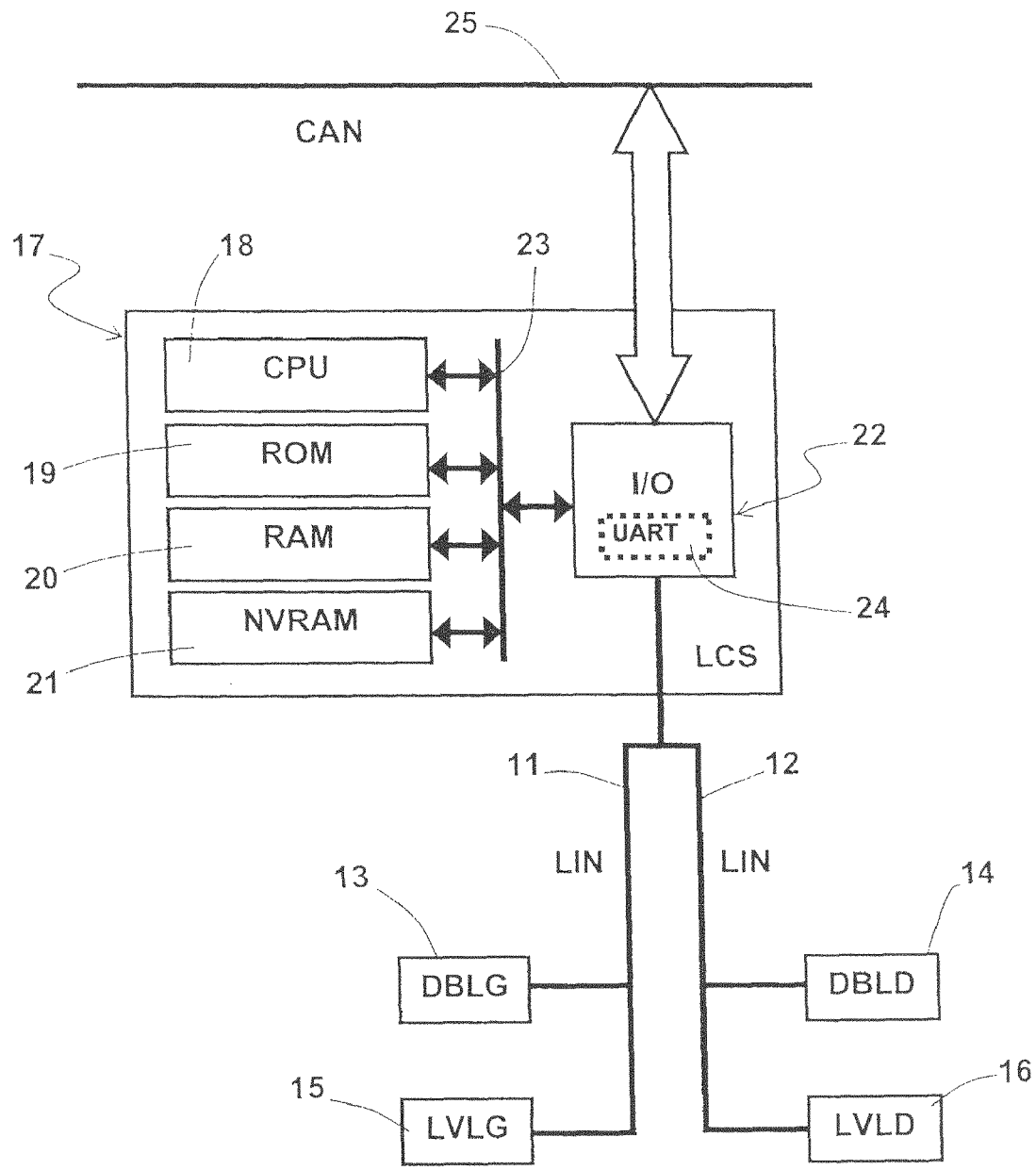

FIG. 5 is a schematic view of a control device for a directional lighting and headlight adjustment system using the method according to the invention.

DESCRIPTION OF THE PREFERRED EMBODIMENTS OF THE INVENTION

Figure 1:
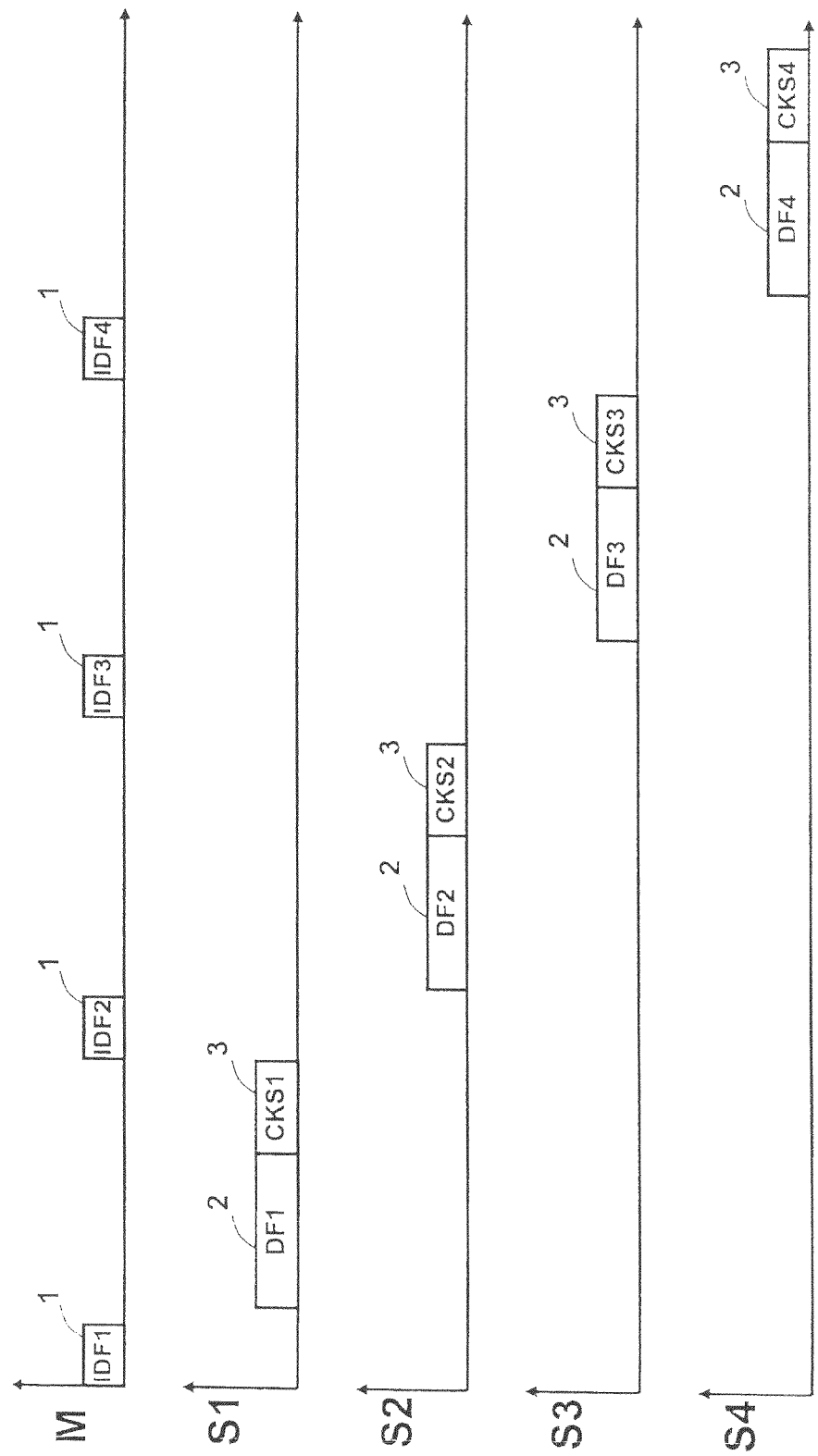
FIG. 1 shows schematically a series of prior art timing diagrams of message frames of the standard LIN protocol.
Figure 2:
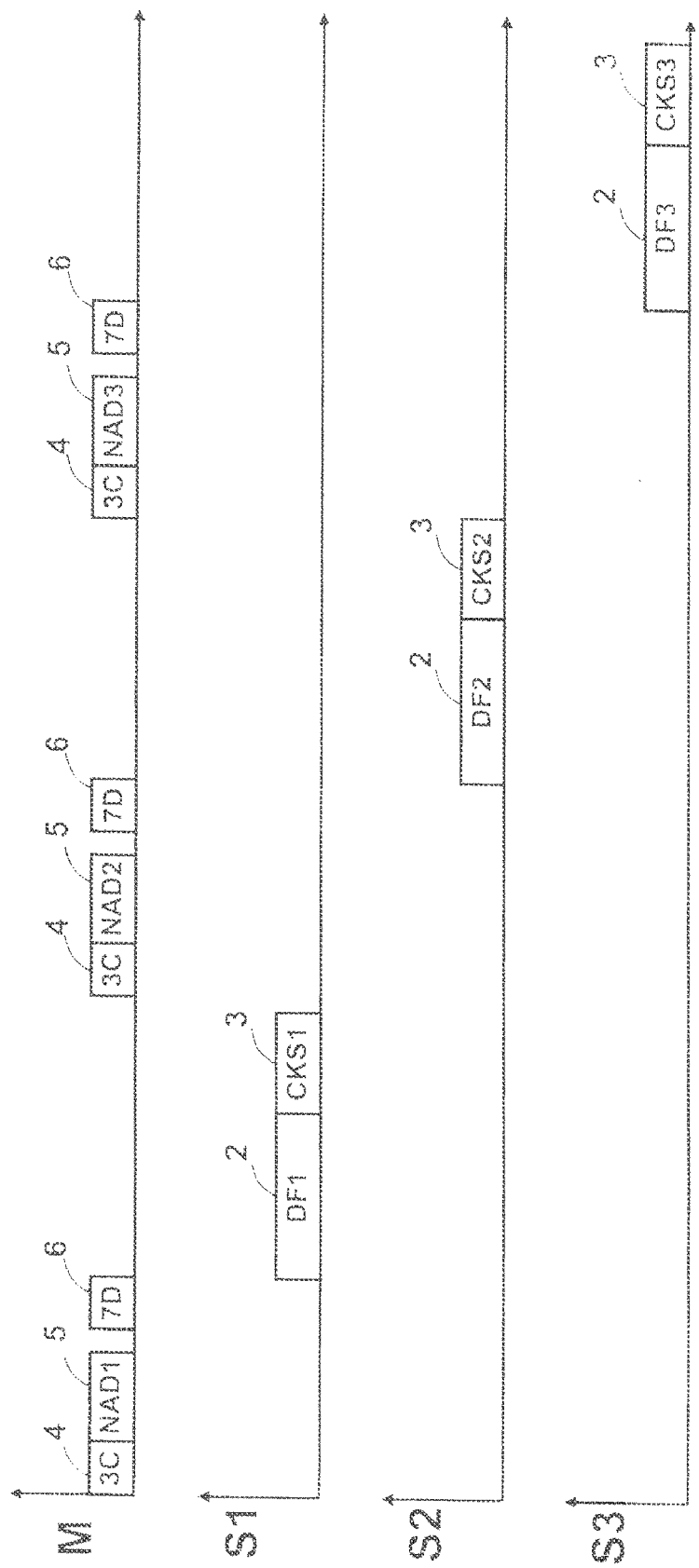
FIG. 2 shows schematically a series of prior art timing diagrams of command frames of the standard LIN protocol.

In order to clearly show the differences between the timing diagrams of data exchanges according to the protocol used by the invention and the timing diagrams of the message and command frames of the standard LIN protocol, examples of the latter have been depicted, for the record, in FIGS. 1 and 2, respectively.

In FIG. 1, the line for the master station M shows that it sends on the bus a succession of identifiers 1 with the values IDF1, IDF2, IDF3, IDF4 lying between 00 and 3B, corresponding to message frames.

This transmission is filtered by four slave stations S1, S2, S3 and S4 which are continuously listening to the traffic on the bus.

When one of the four stations S1, S2, S3, S4 recognizes an identifier 1 to which it is programmed to respond, it places on the bus a specific data frame 2 with the value DF1, DF2, DF3 or DF4 followed by a checksum 3 with the value CKS1, CKS2, CKS3 or CKS4.

The master station M of FIG. 2 sends on the bus a succession of identifiers 1 with the values 3C and 7D corresponding to command frames (see Table I).

The request identifier (3C) 4 of the master station M is followed by a data frame 5 with the value NAD1, NAD2, NAD3 or NAD4 allowing one of the three slave stations S1, S2 or S3 for which the command is intended to identify itself. The destination station immediately transmits a specific data frame 3 with the value DF1, DF2 or DF3 when it decodes the corresponding activation identifier (7D) 6.

Whether by means of message frames (FIG. 1) or command frames (FIG. 2), the standard protocol of the LIN network lays down the use of a whole data frame 2 with a length of two, four or eight bytes for each read of a slave station status.

For example, in the case of frames of eight bytes, since the LIN network allows only one frame every 10 ms at minimum, the result is that the more slave stations S1, S2, S3, S4 the network has, the greater is the periodicity of reading their status whatever furthermore the length of the status word 2 to be transmitted.

Figure 3:
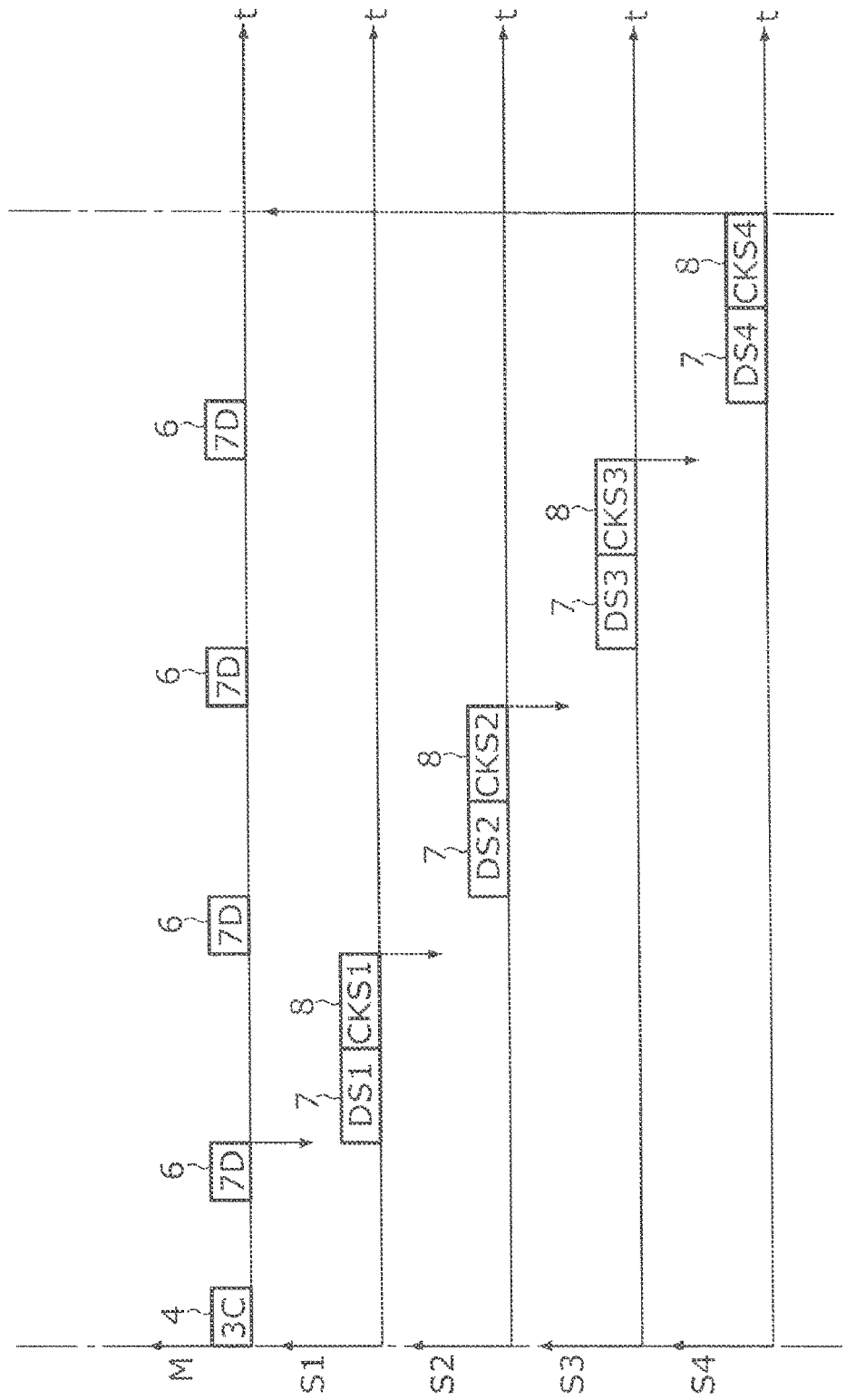
FIG. 3 shows schematically a series of timing diagrams of command frames used in the method according to the invention compatible with the LIN standard.
Figure 4:
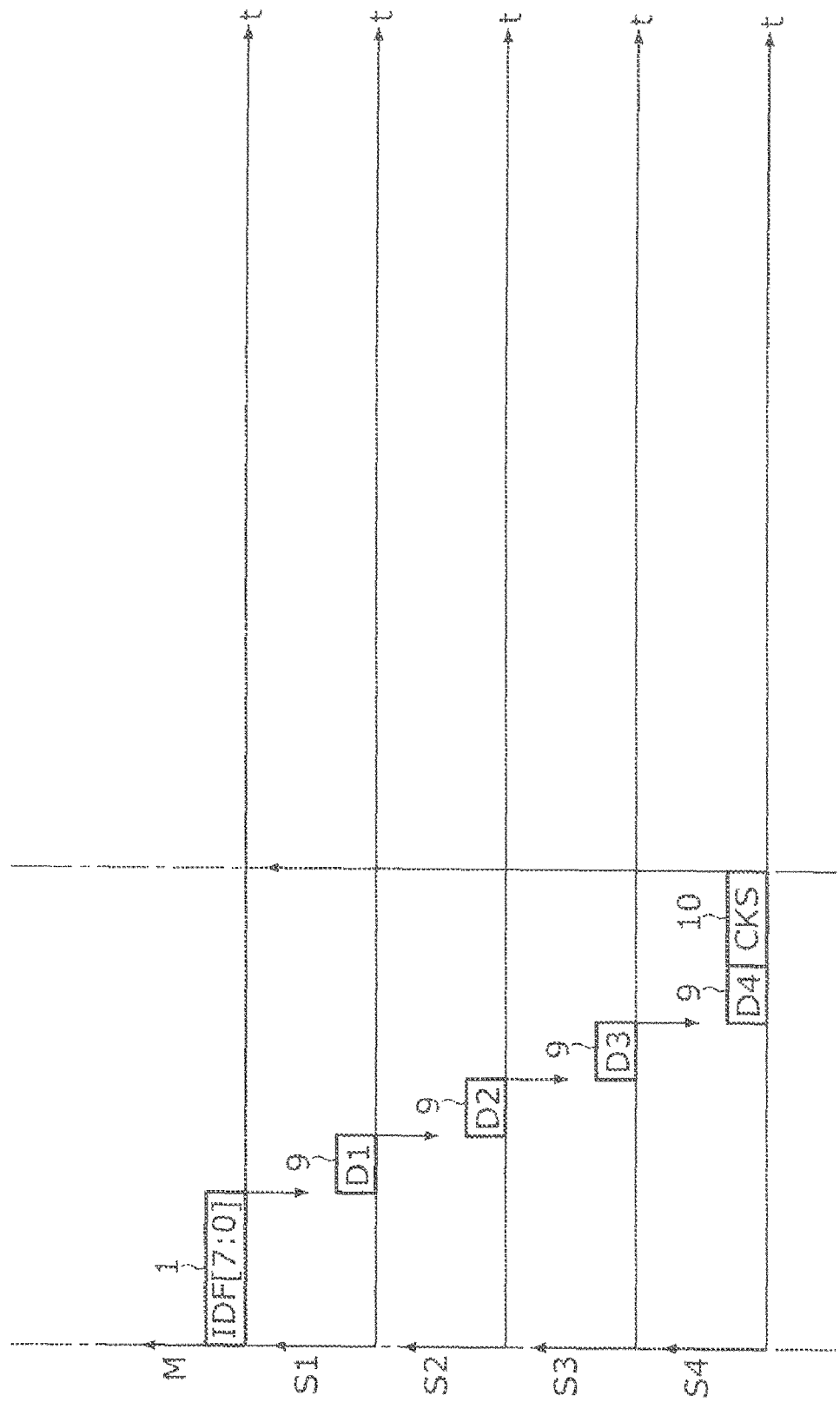
FIG. 4 shows schematically a series of timing diagrams of message frames used in the method according to the invention compatible with the LIN standard.

As the general description of the invention has already indicated briefly, the principle of the communication method illustrated by the timing diagrams of FIGS. 3 and 4 consists of sharing a data frame sent in response to an identifier between several slave stations.

According to the first embodiment of the invention, corresponding to FIG. 3, the master station M sends an identifier 4 with the value 3C, that is to say a master request, to all the slave stations S1, S2, S3, S4.

These each respond in their turn in the frame initiated by the identifier 4 with the code 3C to the reception of a succession of activation identifiers 6 with the code 7D by placing in series on the bus their specific data frames 7 with the values DS1, DS2, DS3 and DS4 followed by end-of-frame blocks 8 consisting of respective checksums CKS1, CKS2, CKS3 and CKS4.

A comparison of the timing diagrams of FIGS. 1 and 3 makes the reduction in load on the bus provided by the method according to the invention obvious. This is because the status words 7 of the slave stations S1, S2, S3, and S4 sent in a command frame are advantageously shorter than the minimum of two bytes of a message frame.

The same observation can be made by comparing FIGS. 2 and 3. This is because there is no transmission of identification data 5 of the stations on the network.

According to the second embodiment of the invention, corresponding to FIG. 4, reading of the status of the slave stations S1, S2, S3 or S4 by the master station M is implemented by the latter by sending an identifier 1 with a code lying between 00 and 3B, that is to say an identifier 1 corresponding to a message frame.

In response to this identifier 1, each of the slave stations S1, S2, S3 and S4 sends, each in its turn, a sub-frame 9 with the value D1, D2, D3 or D4 in order to fill the data frame of the message.

The last slave station S4 completes the series of sub-frames 9 sent with a checksum 10 calculated on all these sub-frames 9.

The advantage of this second embodiment of the invention in terms of load on the bus compared with the standard LIN protocol also appears clearly by comparing the timing diagrams of FIG. 4 with those of FIGS. 1 and 2:
transmission of the same message identifier 1 for several slave stations S1, S2, S3, S4;
a single data frame for the four slave stations instead of a complete frame 2 per station;
a single checksum 10.

The effect of using the communication method according to the invention on a LIN network 11, 12 used for controlling a directional lighting 13, 14 and headlight adjustment 15, 16 system such as the one depicted schematically in FIG. 5 is a distinct improvement in the response time of the system.

The effect of using the communication method according to the invention on a LIN network 11, 12 used for controlling a mechanical device, such as directional lighting 13, 14 and headlight adjustment 15, 16 system such as the one depicted schematically in FIG. 5 is a distinct improvement in the response time of the system.

The master station of the network is a dedicated on-board computer 17 constituting the lighting control system (LCS).

This computer 17 usually comprises a central processing unit 18, of microprocessor, microcontroller or similar type, a prerecorded program memory 19 of ROM type, a working memory 20 of RAM type, and preferably a non-volatile storage memory 21 of FLASH type.

These elements 18, 19, 20, 21 are architectured around an internal bus 23 connected to an interface module 22 for I/O information exchanges with the outside.

The interface module 22 comprises a UART 24 capable of managing the serial communication protocol of the two branches, left and right, of a LIN network 11, 12 on which there are connected four slave stations 13, 15, 14, 16 constituted respectively, on the one hand, by the left directional lighting system DBLG and the left headlight adjustment system LVLG, and, on the other hand, by the right directional lighting system DBLD and the right headlight adjustment system LVLD.

These slave stations 13,14,15,16 comprise in a manner known per se standard LIN interface circuits and network controllers allowing them to communicate on the bus with the master station 17. These network controllers are microprogrammed so as to sequentially generate the frames 7 or parts 9 of frames in response to the identifiers 1, 4, 6 sent.

The control data for these systems 13, 14, 15, 16 depend on certain parameters originating from the "under the bonnet" functions, like for example the speed of the vehicle, or its attitude; the interface module 22 is therefore also connected to the CAN bus 25 of the vehicle.

Within the context of the standard LIN network protocol, the actuators of the DBLG, LVLG, DBLD, LVLD systems are commanded together by a command frame, and the status sensors are read individually by a message frame.

A read/write sequence is typically as follows:
a) commanding of the four slave stations DBLG, LVLG, DBLD, LVLD;
b) reading of DBLD;
c) commanding of the four slave stations DBLG, LVLG, DBLD, LVLD;
d) reading of DBLG;
e) commanding of the four slave stations DBLG, LVLG, DBLD, LVLD;
f) reading of LVLD;
g) commanding of the four slave stations DBLG, LVLG, DBLD, LVLD;
h) reading of LVLG.

As already mentioned, the LIN network allows only one frame every 10 ms at minimum, which creates a time period of 80 ms between two consecutive reads of the status of a given slave station. Such a time period is not negligible when the constraint concerning the response time of the system is of the order of 40 ms to 100 ms, and a degraded mode must be detected and reported in less than 3 seconds.

Using the first embodiment of the communication method according to the invention, an example control sequence for the AFS systems 13, 14, 15, 16 is typically as follows:
a) commanding of the four slave stations DBLG, LVLG, DBLD, LVLD;
b) sending of the status read command (3C);
c) commanding of the four slave stations DBLG, LVLG, DBLD, LVLD;
d) reading of the four slave stations DBLG, LVLG, DBLD, LVLD.

The duration of a control cycle is then reduced to 70 ms.

Use of the second embodiment of the communication method according to the invention leads to an additional reduction in the duration of the cycle. In this case, an example control sequence for the AFS systems 13, 14, 15, 16 is typically as follows:
a) commanding of the four slave stations DBLG, LVLG, DBLD, LVLD;
b) reading of the four slave stations DBLG, LVLG, DBLD, LVLD.

The duration of a control cycle is then only 20 ms.

In a manner known per se, the sequences of instructions making it possible to implement the above control sequences or cycles are preferably stored in the ROM 19 of the LCS computer 17.

These are preferentially machine instructions, but in an equivalent manner they can be sequences of a command language interpreted by the CPU 18 at the time they are executed.

Implementation of the communication method described above by means of a microprogrammed device, or even of ASIC type wired logic, would not depart from the scope of the invention either.

Persons skilled in the art will have understood, in view of the above, that a vehicle, in particular a motor vehicle, equipped with the communication device, the information storage means and the computer program described previously, has the benefit at lower cost of an on-board network architecture capable of accommodating the most advanced electronic security and comfort systems, and therefore has an obvious competitive advantage.

As it is self-evident the invention is not limited solely to the two preferential embodiments described above.

On the contrary it encompasses all other possible variant implementations, compatible with the LIN standard and its future developments, insofar as they would ensue from the claims hereinafter.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. A method of communication in an on-board network in a motor vehicle, between a master station and a plurality of slave stations in which network data frames are ordinarily sent by said plurality of slave stations on a serial bus in response to requests, one for each slave, sent on said serial bus by said master station, said method comprising:
   a) causing said master station to transmit a travelling request frame onto said serial bus;
   b) causing a first slave station to:
      i) receive said travelling request frame,
      ii) insert first data into said travelling request frame, and
      iii) return said travelling request frame onto the serial bus;
   c) causing a plurality of other slave stations to:
      i) receive said travelling request frame from said first slave station,
      ii) insert, for each of said plurality of other slave stations, other slave station data into said travelling request frame, and
      iii) return said travelling request frame to said serial bus;
   d) causing said master station to receive said travelling request frame, containing said first data and said other slave station data added by said first slave station and each of said plurality of other slave stations, respectively; and
   e) after said master station receives said travelling request frame, causing at least one of said plurality of slave stations to actuate a device within the motor vehicle based on said first data from said first slave station and said data from each of said plurality of other slave stations inserted into said travelling request frame;
   wherein said travelling request frame is submitted once on the serial bus by said master station in connection with collecting of data from said plurality of other slave stations by said master station and said first slave station and each of said plurality of other slave stations insert, each in its turn, said first data and said other slave station data, respectively, onto said serial bus and into said travelling request frame in response to said travelling request frame, wherein a single checksum calculated on said first data from said first station and said other slave station data from said plurality of other slave stations is inserted into said travelling request frame;
   wherein said single travelling request frame contains no identification data that identifies any of said first slave station or said plurality of other slave stations.

2. The method of communication on an on-board network according to claim 1, wherein each of said first data and said other slave station data is formed from several sub-frames.

3. The method of communication on an on-board network according to claim 2, wherein the last of said plurality of slave stations to sequentially send the last of said sub-frames sends consecutively an end-of-frame block, preferably consisting of said single checksum calculated on all said sub-frames.

4. A method according to claim 1, in which total time required to collect said data from said plurality of slave stations is not greater than time elapsed between (A) transmitting of said travelling request frame by said master station and (2) receipt of said travelling request frame by said master station.

5. A method according to claim 1 in which said traveling request frame contains a master code which induces each slave station to place its data frame on the serial bus with said traveling request frame.

6. The method of communication on an on-board network according to claim 5, wherein each slave station places its data frame in series on the communication bus.

7. A method according to claim 1, in which said plurality of slave stations do not add data to the traveling request frame which identifies data added by said plurality of slave stations.

8. A method according to claim 1, in which no frames or packets apart from said traveling request frame are transmitted when data from said plurality of slave stations is being placed on the serial bus.

9. A method according to claim 8, in which a single checksum is transmitted in connection with collection of said data from said plurality of slave stations with data from a last one of said plurality of slave stations.

10. A method according to claim 8, in which a single request is transmitted by said master station in connection with collection of said data from said plurality of slave stations.

11. The method of communication on an on-board network according to claim 1, wherein said device within said motor vehicle is a directional lighting function.

12. The method of communication on an on-board network according to claim 1, wherein said device within said motor vehicle is a headlight adjustment.

13. A method for use in a motor vehicle, comprising the steps of:
   a) maintaining a master station and a plurality of slave stations;
   b) maintaining a network which:
      i) connects all plurality of slave stations in parallel with said master station, such that said master station and said plurality of slave stations all have access to data on said network simultaneously;
      ii) transfers data at a maximum rate per second;
      iii) transfers all data serially;
   c) causing said master station to place on said network a data frame once on a communication bus in connection with collecting data by said master station from said plurality of slave stations;
   d) causing a plurality of slave stations to issue a response to said data frame, wherein a total amount of data from all of said plurality of slave stations is no more than the maximum available bytes of data that can be placed on said communication bus;
      i) each of said plurality of slave stations places bytes of slave station data into said data frame;
      ii) a last one of said plurality of slave stations also places:
         A) a single checksum into said data frame which is based on all bytes of data inserted by said plurality of slave stations, and
         B) said data frame onto the network for retrieval of said data frame and said inserted bytes of data by said master station;
   wherein said data frame from said master station is submitted only once on the communication bus and each of said plurality of slave stations insert their bytes of slave station data, respectively, into said data frame in response to said data frame from said master station;

wherein said data frame from said master station does not contain any identification information for any of said plurality of slave stations.

14. The method according to claim 13, and further comprising the steps of:
e) maintaining a mechanical device within the vehicle, said mechanical device being associated with and under the control of a slave station A;
f) causing said master station to formulate a command based on some or all of the bytes received in the data frame;
g) causing said master station to transmit the command to slave station A; and
h) causing said slave station A to issue instructions which cause motion within said mechanical device.

15. The method of communication on an on-board network according to claim 14, wherein said mechanical device is a headlight, said slave station A causing said motion within said mechanical device.

16. The method of communication on an on-board network according to claim 14, wherein each slave station places its data frame in series on the communication bus.

17. The method according to claim 13, in which said plurality of slave stations comprises a first slave station, a second slave station, a third slave station and a fourth slave station, wherein said master station receives a fourth data frame from said fourth slave station less than 20 milliseconds after placing said request frame onto said network.

18. In a motor vehicle, a method comprising:
a) maintaining a master station and a plurality of slave stations, all connected to a bus which
  i) has a maximum data rate per second; and
  ii) carries data in serial format;
b) causing said master station to issue on said bus a request frame, which
  i) requests data from said plurality of slave stations,
  ii) induces said plurality of slave stations to collectively return to said master station bytes of data in said request frame where said bytes of data do not exceed the maximum data rate of said bus;

wherein said request frame is submitted only once on the serial bus in connection with collecting data by said master station from all of said plurality of slave stations, and each of said plurality of slave stations insert their respective bytes of data, respectively, into said request frame in response to said request frame;

wherein said request frame from said master station does not contain any identification information for any of said plurality of slave stations and a single checksum, based upon said data from all of said plurality of slave stations, is inserted into said request frame.

* * * * *

UNITED STATES PATENT AND TRADEMARK OFFICE
CERTIFICATE OF CORRECTION

PATENT NO. : 8,065,042 B2  
APPLICATION NO. : 11/458213  
DATED : November 22, 2011  
INVENTOR(S) : Loic Flandre and Gregoire Sadoux Page 1 of 1

It is certified that error appears in the above-identified patent and that said Letters Patent is hereby corrected as shown below:

In the Specification

In Column 4, Line 35, after frame, please delete "3" and insert -- 2 -- therefor.

Signed and Sealed this
Eleventh Day of June, 2013

Teresa Stanek Rea
*Acting Director of the United States Patent and Trademark Office*